April 23, 1968
C. TORRISI
3,379,452
HAND-TOWABLE BOAT TRAILER
Filed June 16, 1966
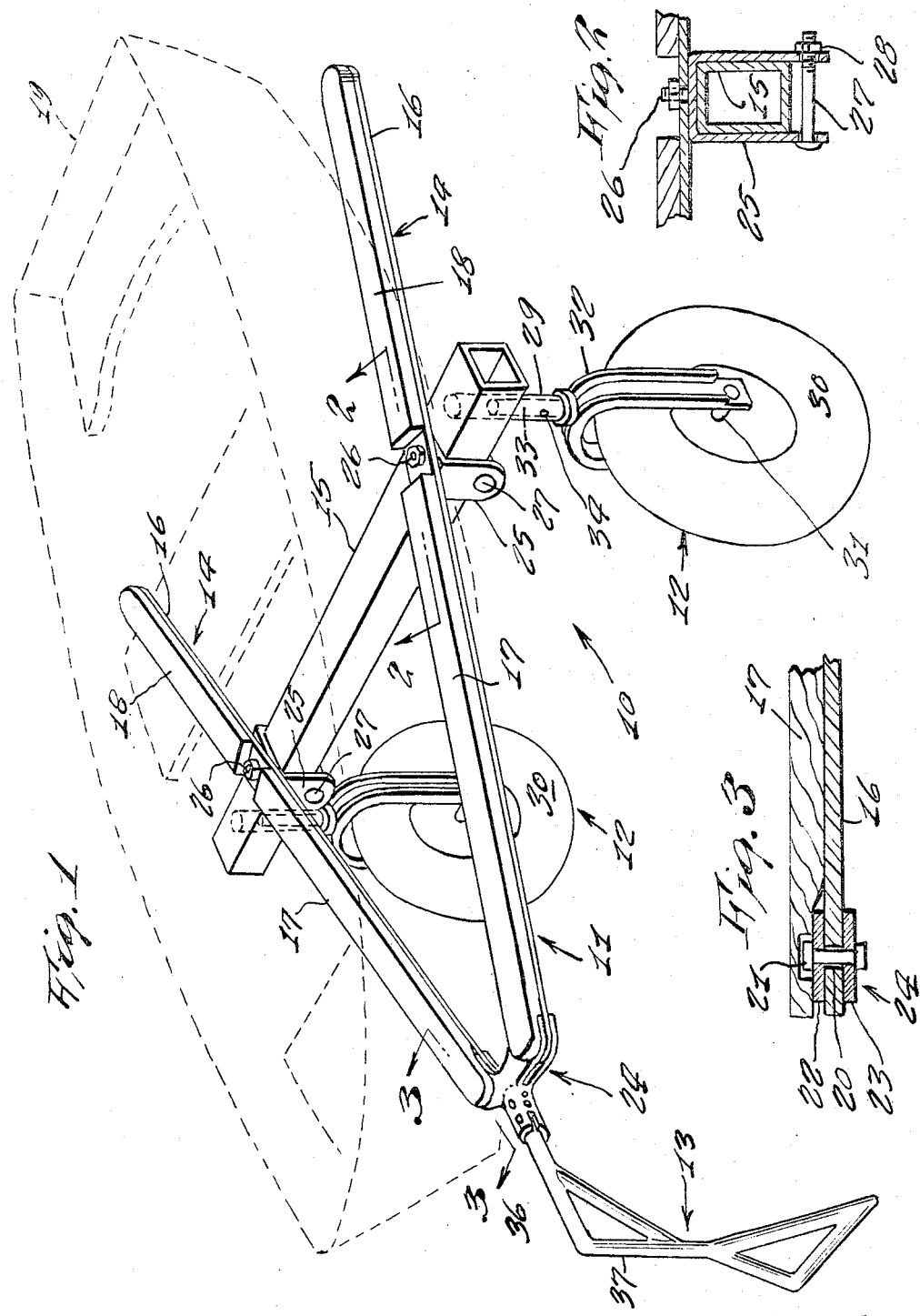
INVENTOR
CARMELO TORRISI 3,379,452
HAND-TOWABLE BOAT TRAILER
Carmelo Torrisi, 2103 62nd St.,
Brooklyn, N.Y. 11204
Filed June 16, 1966, Ser. No. 557,950
4 Claims. (Cl. 280—63)

ABSTRACT OF THE DISCLOSURE

A trailer for a boat comprising a horizontal A-frame having hinged legs connected to a crossbar mounted on wheels wherein the connection between the legs and the crossbar is adjustable to accommodate varying boat sizes.

This invention relates generally to boat trailers for the purpose of transporting boats by hand.

A principal object of the present invention is to provide a novel boat trailer having an A-frame chassis that is adjustable to accommodate various sizes of boats placed thereupon.

Another object is to provide a novel boat trailer that incorporates an adjustable leg for the purpose of supporting the chassis in a horizontal position over the ground, and for towing the trailer.

Other objects are to provide a novel boat trailer that is simple in design, inexpensive to manufacture, rugged in construction, easy to use and efficient in operation.

These and other objects will be readily evident upon a study of the following specification and the accompanying drawing wherein:

FIGURE 1 is a perspective view of the present invention showing in phantom lines a boat placed thereupon, FIGURE 2 is a cross sectional view taken on line 2—2 of FIGURE 1, and FIGURE 3 is a cross sectional view taken on line 3—3 of FIGURE 1.

Referring now to the drawing in detail, the reference numeral 10 represents a boat trailer according to the present invention wherein there is a chassis 11 of A-shaped configuration that is supported upon a pair of wheel assemblies 12 and a leg unit 13.

The A-frame chassis 11 includes a pair of side beams 14 pivotable about their one ends and a transverse extending cross beam 15 that is secured across the two side beams to hold them in a fixed apart position relative to each other.

Each side beam comprises a longitudinal metal bar 16 that has a pair of wooden runners 17 and 18 secured to the upper side thereof and which provides a scuff-free surface for a boat 19 that is skidded thereupon. An opening 20 in each bar 16 receives a bolt 21 that passes through upper and lower plates 22 and 23, respectively, of a bracket 24 at the front end of the chassis, the bars 16 being fitted between the plates 22 and 23. A U-shaped bracket 25 is supported pivotally free on the underside of each side beam by means of a bolt 26, the brackets 25 straddling the cross beam 15. The brackets 25 are slidable along the cross beam, and secured in selected position thereto by means of bolts 27 passing through each bracket 25 and across the underside of the cross beam, as shown in FIGURE 2. The bolt 27 receives a nut 28 for purpose of tightening the bracket 25 against the sides of the cross beam.

The cross beam is a tubular metal member of square cross sectional configuration and having a pair of downwardly extending pipes 29 firmly secured thereto.

Each wheel assembly 12 comprises a rubber tired wheel 30 supported rotatably free on a shaft 31 held on a U-shaped bracket 32 having an integral upward extending post 33 receivable within the pipe 29. A set screw or dowel 34 locks the wheel assembly to prevent rotation within the pipe.

The leg unit 13 is adjustably secured within a sleeve 35 integrally a part of the bracket 24, and is movable between a vertical or horizontal position as required. The leg unit comprises a tubular metal member having a horizontal arm 36 receivable within the sleeve, and a leg 37 perpendicular thereto, the leg 37 having a triangular foot 38 at its terminal end. A brace 39 provides strength to the construction.

In operative use, the nuts 28 are loosened to permit free sliding of the bracket along the cross beam for adjusting the A-frame to the particular size and shape of the hull of the boat. After adjustment, the nuts 28 are tightened and the chassis is ready to receive the boat for transportation thereupon.

While various changes may be made in the detail construction, it is understood that such changes will be within the spirit and scope of the present invention as is defined by the appended claims.

Having thus set forth and disclosed the nature of this invention, what is claimed is:

1. In a boat trailer the combination of a chassis, a pair of wheel assemblies, and a leg unit, said chassis being supported upon said leg unit at its forward end and upon said wheel assemblies near its rear end, said wheel assemblies being in transverse alignment with each other, means for adjusting said chassis for accommodation of various size or shape of boat hull placed thereupon for purpose of transportation on said boat trailer, said chassis comprising an adjustable horizontal A-frame having a pair of side beams pivotably adjustable at their one ends relative to each other, and a connecting cross beam therebetween, each of said side beams comprising a lower metal bar having wooden runners secured to the upper side thereof, the forward ends of said metal bars being held pivotally free to a common bracket an intermediate portion of said bar between its opposite longitudinal ends having a U-shaped bracket supported pivotally free on its underside for receiving said cross beam, and a bolt and nut carried on said U-shaped bracket for adjustably securement around said cross beam.

2. The combination as set forth in claim 1 wherein said cross beam comprises a square configurated member in cross section having a pair of downward pipes secured on its underside for receiving said wheel assemblies.

3. The combination as set forth in claim 2 wherein said wheel assemblies each comprises a rubber tired wheel on a shaft supported on a U-shaped bracket having an upward port receivable within said pipe and rigidly secured thereto.

4. The combination as set forth in claim 3 wherein said leg unit comprises a horizontal arm receivable within a sleeve formed on said common bracket, a leg perpendicular thereto, a triangular foot at the end of said leg, and a brace between said arm and said leg.

References Cited

UNITED STATES PATENTS

| | | | |
|---|---|---|---|
| 2,042,598 | 6/1936 | Harvey | 115—1 |
| 2,516,574 | 7/1950 | Holly. | |
| 2,644,176 | 7/1953 | Livermon | 9—1 |
| 2,651,498 | 9/1953 | Straub | 254—127 |
| 2,765,942 | 10/1956 | Niemeier | 214—506 |
| 3,020,063 | 2/1962 | Warren | 280—150.5 |

LEO FRIAGLIA, Primary Examiner.